US006836507B1

(12) United States Patent
Gifford et al.

(10) Patent No.: US 6,836,507 B1
(45) Date of Patent: Dec. 28, 2004

(54) SYMBOL SYNCHRONIZER FOR SOFTWARE DEFINED COMMUNICATIONS SYSTEM SIGNAL COMBINER

(75) Inventors: Carl Steven Gifford, Gilbert, AZ (US); John Eric Kleider, Scottsdale, AZ (US); Jeffery Scott Chuprun, Scottsdale, AZ (US); Chad S. Bergstrom, Chandler, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 653 days.

(21) Appl. No.: 09/639,496

(22) Filed: Aug. 14, 2000

(51) Int. Cl.$^7$ ............................................... H04B 1/707
(52) U.S. Cl. ...................................... 375/150; 375/152
(58) Field of Search ............................... 375/142, 143, 375/150–153, 144, 148, 347, 343, 354

(56) References Cited

U.S. PATENT DOCUMENTS

| | | | |
|---|---|---|---|
| 6,282,229 B1 * | 8/2001 | Aoyama | 375/130 |
| 6,377,613 B1 * | 4/2002 | Kawabe et al. | 375/142 |
| 2001/0036223 A1 * | 11/2001 | Webster et al. | 375/152 |

OTHER PUBLICATIONS

"Blind Algorithms for Joint Clock Recovery and Baseband Combining in Digital Radio", F. Guglielmi et al., Radio Relay Systems Conference, Publication No. 386, Oct. 1993, pp. 279–286.

"Combined Equalization, Decoding, and Antenna Diversity Combining for Mobile/Personal Digital Radio Transmission Using Feedforward Synchronization", S. A. Fachtel et al., Proceedings of Vehicular Technology Conference, 43$^{rd}$ IEEE, 1993, pp. 633–636.

"Performance of Nonlinear Receivers in Mobile Communications", A.R.S. Bahai, Proceedings of ICC, vol. 2, 1993, pp. 1209–1212.

(List continued on next page.)

*Primary Examiner*—Amanda T. Le
(74) *Attorney, Agent, or Firm*—Jenner & Block LLP

(57) ABSTRACT

A symbol synchronizer (100) is provided for a software-defined communications system (10). The symbol synchronizer (100), when integrated into either a pre- or post-detection diversity signal combiner (108, 208), enables highly accurate signal synchronization with minimal added system complexity. The symbol synchronizer (100) includes a single complex sliding window matched filter (102) for filtering an input digital signal with a match filtering function based on predetermined signal transfer function characteristics to average out receiver noise from the signal. A signal delay bank (84) includes a plurality of delay blocks each for delaying the digital signal filtered by the single matched filter for a predetermined number of samples. A complex correlator (88) correlates the digital signal filtered by the single complex sliding window matched filter (102) and delayed by the complex correlator (88) with a correlator reference signal, and selects an index of a path having a peak correlator value. As a result of such a configuration, the symbol synchronizer (100) is capable of determining symbol boundaries of channel signals in a multi-channel communications system to enable system signal measurement statistics and demodulated to be more accurately generated.

11 Claims, 13 Drawing Sheets

OTHER PUBLICATIONS

*Digital Communications,* B. Sklar, Fundamentals and Applications, Prentice Hall, 1988. (not included).
*Digital Communications,* J.G. Proakis, $3^{rd}$ Ed. McGraw–Hill, 1995. (not included).
"Blind Adaptation Using Maximin Algorithm", D. Torrieri et al., Asilomar Conference on Signals, Systems and Computers, Nov. 1993, pp. 638–642.
*Digital Communication Receivers,* H. Meyr et al., John Wiley & Sons, 1998. (not included).
"Joint Blind Equalization, Carrier Recovery, and Timing Recovery for 64–QAM and 128–QAM Signal Constellations", N.K. Jablon, Proceedings of ICC, vol. 2, 1989, pp. 1043–1049.

"Digital Communications in Fading Channels", Mission Research Corporation, Final Report PL–TR–92–1024, Mar. 1993. (not included).

"Real–time Implementation of a Reconfigurable IMT–2000 Base Station Channel Modem", D. Murotake et al., Software and DPS in Radio, IEEE Communications Magazine, Feb. 2000, pp. 148–152.

"An ADEPT Performance Model of the Mercury RACEway Crossbar Interconnection Network", G. Han et al., Proceedings of $6^{TH}$ Annual Conference on Parallel Interconnects (PI'99), pp. 83–90.

* cited by examiner

SYMBOL SYNCHRONIZER FOR SOFTWARE DEFINED COMMUNICATIONS SYSTEM SIGNAL COMBINER

The invention disclosed herein was developed under U.S. Government Contract No. DAAL01-96-2-0002. The U.S. Government has certain rights to this invention.

BACKGROUND OF THE INVENTION

1. Field of the Invention

The present invention relates generally to communications systems, and more particularly to an architecture for transforming a software defined radio having independently operated channels into a fully shared multi-channel software defined radio.

2. Description of Related Art

A coherent digital communications system typically requires that signal phase, symbol and frame synchronization be performed at the system receiver, as the phase of the transmitted carrier signal must be accurately reproduced at the receiver. In addition, the receiver must have the capability of determining the timing boundaries of the transmitted symbols. This capability is referred to as symbol synchronization.

In wireless digital radios having multi-element antenna arrays, multi-path fading often significantly degrades communications system performance. The effects of fading can be countered through spatial diversity techniques in which antenna elements are separated as a function of signal wavelength so that associated Rayleigh fading is independent at each antenna. Consequently, when a deep Rayleigh fade occurs at one of the antennas, other antennas in the array will likely have corresponding stronger signal reception.

Current spatial diversity techniques attempt to overcome the effects of signal fading by estimating frequency offset and carrier phases and attempt to determine symbol timing. However, these techniques typically add a significant amount of complexity to the radios. In addition, in a radio such as a software defined radio in which digital signals are communicated over wireless channels, a symbol synchronization technique must be robust enough so that the bit error rate (BER) performance of the received data is not degraded. The robustness of the synchronization technique is important, as such systems are often utilized in hostile environments in which interferers and jammers weaken the capability of the radio to synchronize with the desired signal, and in which frequency-hopped signals require the radio to resynchronize after each hop. Because current spatial diversity techniques assume signal synchronization, the techniques therefore often do not provide a symbol synchronization technique that is robust enough for problematic channel operating conditions such as those described above.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
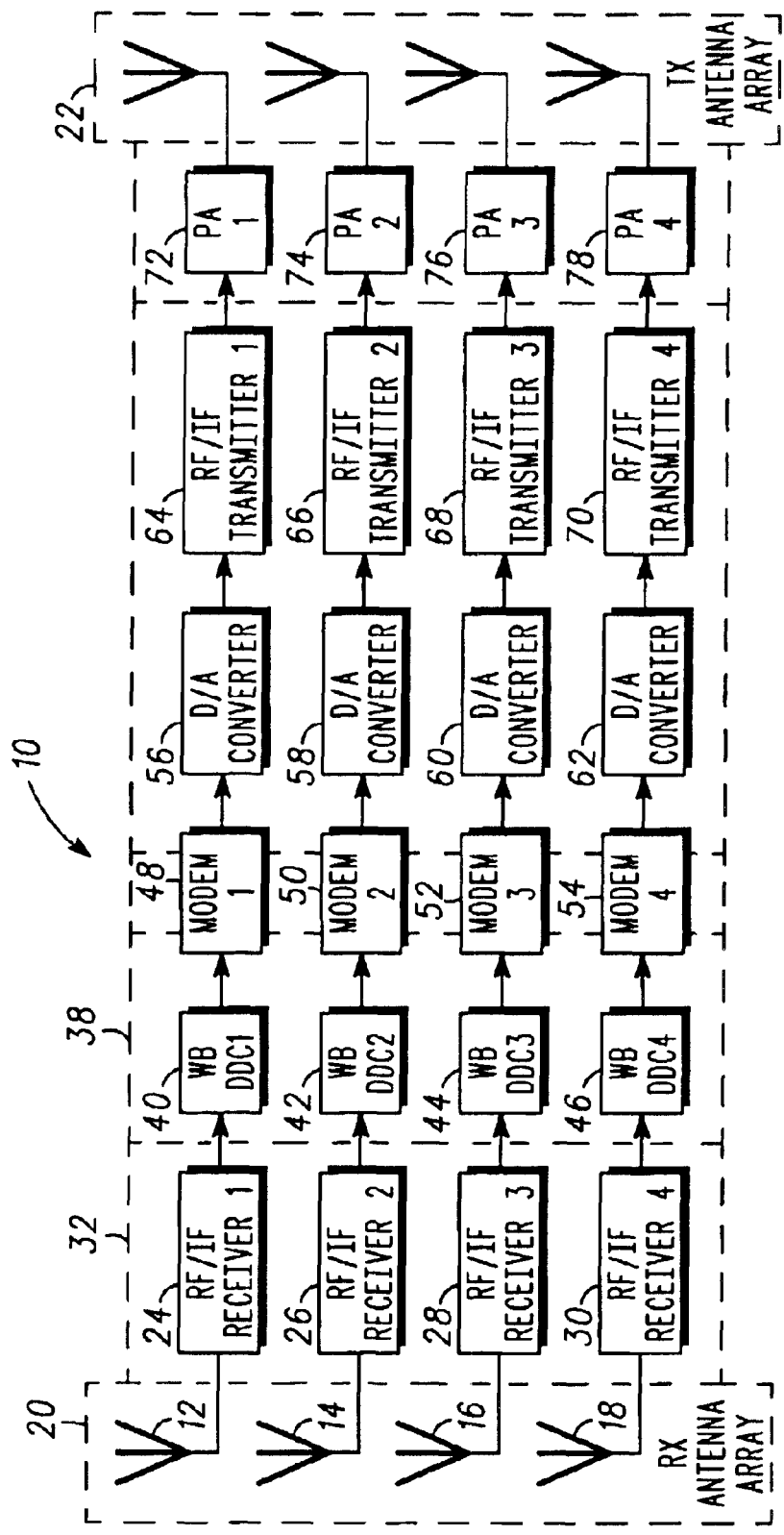
FIG. 1 is a block diagram of a multi-channel software defined radio of the type in which the symbol synchronization in accordance with a preferred embodiment of the present invention is performed.

Referring now to the drawings in which like numerals reference like parts, FIG. 1 shows components of a software-defined multi-channel open architecture communications system, such as a software defined radio, 10 of the type in which a symbol synchronizer according to the present invention is implemented. The radio 10 has numerous hardware and software components that can be individually removed, replaced, upgraded and/or otherwise modified without having to correspondingly modify all other system components. According to a preferred embodiment of the present invention, the system 10 is a Wireless Information Transmitting System (WITS) 5004 multi-channel radio designed and sold by Motorola Corp., the assignee of the present invention. Such a radio may interface to a wide variety of other communications devices such as, for example, internet portals such as personal computers, wireless communications devices such as cellular phones, and/or communications satellites, as well as other WITS radios.

The operation of each of the components in the above-described radio 10 is defined by software that is pre-loaded into the radio and then typically upgraded on a periodic basis. The software itself is composed of numerous components that may be bundled together and provided by a single vendor, or, more typically, individually provided by two or more vendors. Such an open architecture system provides system designers with a high degree of flexibility both in maintaining the system and in modifying the system as system communications requirements change, while at the same time maintaining the underlying integrity of the radio 10. The software can be upgraded via a wireless and/or wireline link to the radio 10.

More specifically, the radio 10 is a multi-channel radio including, for example, four channels 12–18 and both a receiving antenna array 20 and a transmitting antenna array 22 for respectively receiving and transmitting digital signals for each of the channels 12–18. Note that the array 20 and/or the array 22 can be a shared array used for both transmission and reception of communication signals. Each of the channels includes numerous components that can be utilized by the dedicated channel or, in accordance with the present invention, utilized as shared resources by a non-dedicated channel in response to WITS radio application processing requirements. Channel RF/IF receivers 24–30 receive digital waveforms, or signals, from the antenna receiving array 20, and A/D converters (ADCs) 32–38, which include respective digital data converters (DDCs) 40–46, convert analog signals received by the receivers 24–30 to digital signals for signal processing purposes. Digital channel modems 48–54 generate specific timing protocols for signals to be transmitted. Digital to analog converters (DACs) 56–62 convert processed digital signals to analog signals for signal transmission purposes. RF/IF transmitters 64–70 process signals to be transmitted over the transmit antenna array 22, while power amplifiers 72–78 provide appropriate gain to the signals to be transmitted from the transmitters 64–70.

Figure 2:
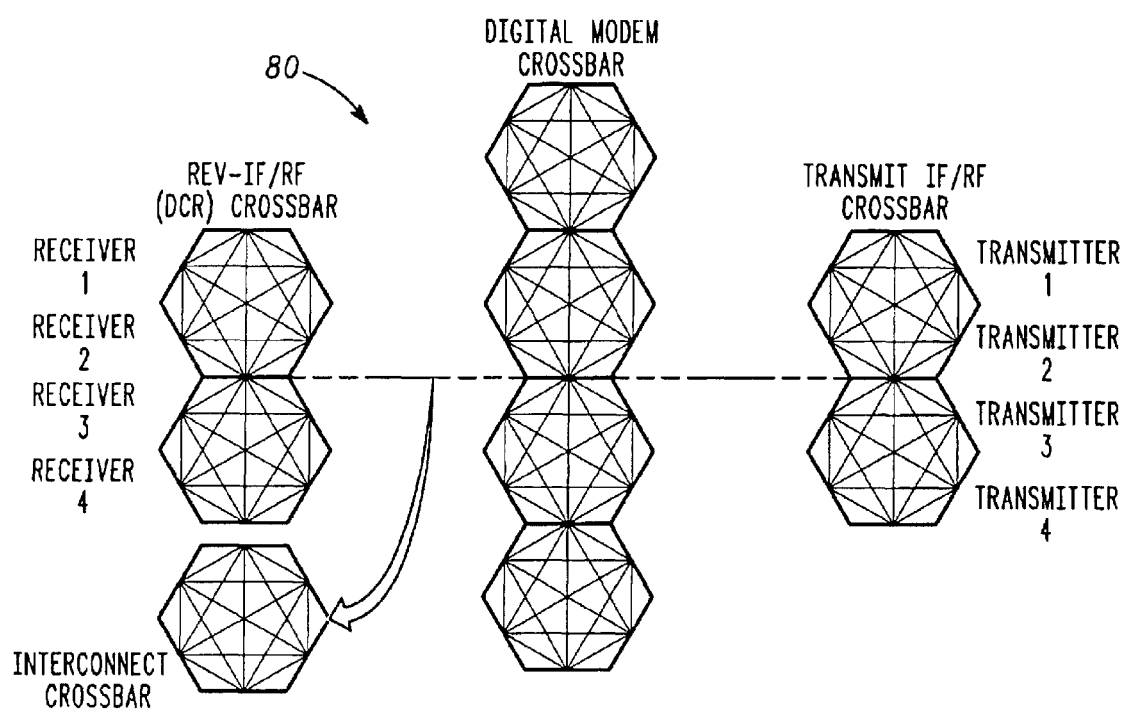
FIG. 2 is a schematic diagram of a crossbar switching network implemented in the multi-channel software defined radio shown in FIG. 1.
Figure 3:
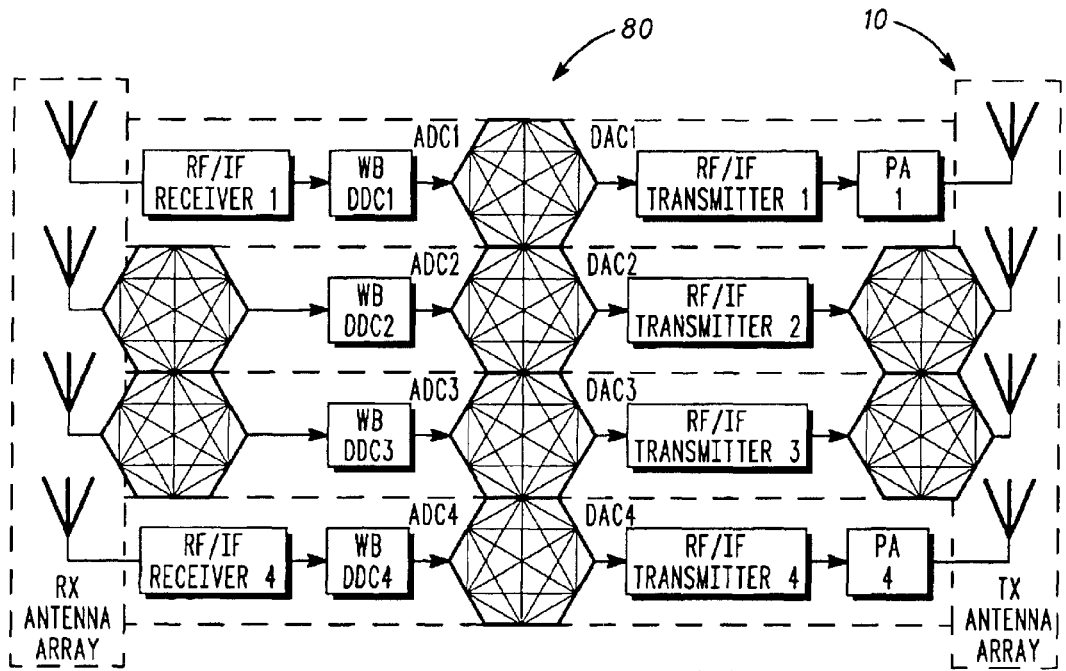
FIG. 3 is a diagram showing the crossbar switching network in FIG. 2 overlayed on the multi-channel software defined radio shown in FIG. 1.

As mentioned above, the software defined radio 10 has an overlapped multi-channel architecture that enables the components on each of the channels 12–18 to be shared and utilized with components on other channels in response to radio application hardware requirements. FIGS. 2 and 3 show an exemplary multiple RACEway crossbar network 80 configured to enable the WITS 5004 radio 10 shown in FIG. 1 to be an overlapped multi-channel according to a preferred embodiment of the present invention. The crossbar network 80, which is, for example, an integrated circuit fabricated and sold by Mercury Computer Corporation, is configured according to a desired segmentation. In the present embodiment, the component segmentations include the channel RF/IF receivers 24–30, digital channel modems 48–54, and RF/IF transmitters 64–70, respectively, although other segmentations may be easily designed. While the radio 10 according to the preferred embodiment includes four channels 12–18, it should be noted that the crossbar network 80 is easily scalable to a higher or lower number of channels.

Signal diversity processing and symbol synchronization are integrated into the radio 10 to improve the probability of the radio generating good signal measurement statistics for use in robust synchronization to the received signal in the presence of interference, fading, and high signal attenuation from the channel. According to the present invention, symbol synchronization can take place either before (pre-detection processing) or after (post-detection processing) signals from each of the antenna elements in the antenna array 20 or 22 are combined in a manner that reduces the time needed to accurately estimate symbol boundaries of transmitted/received waveforms, and in a manner that reduces the overall complexity of the synchronization process.

Figure 4:
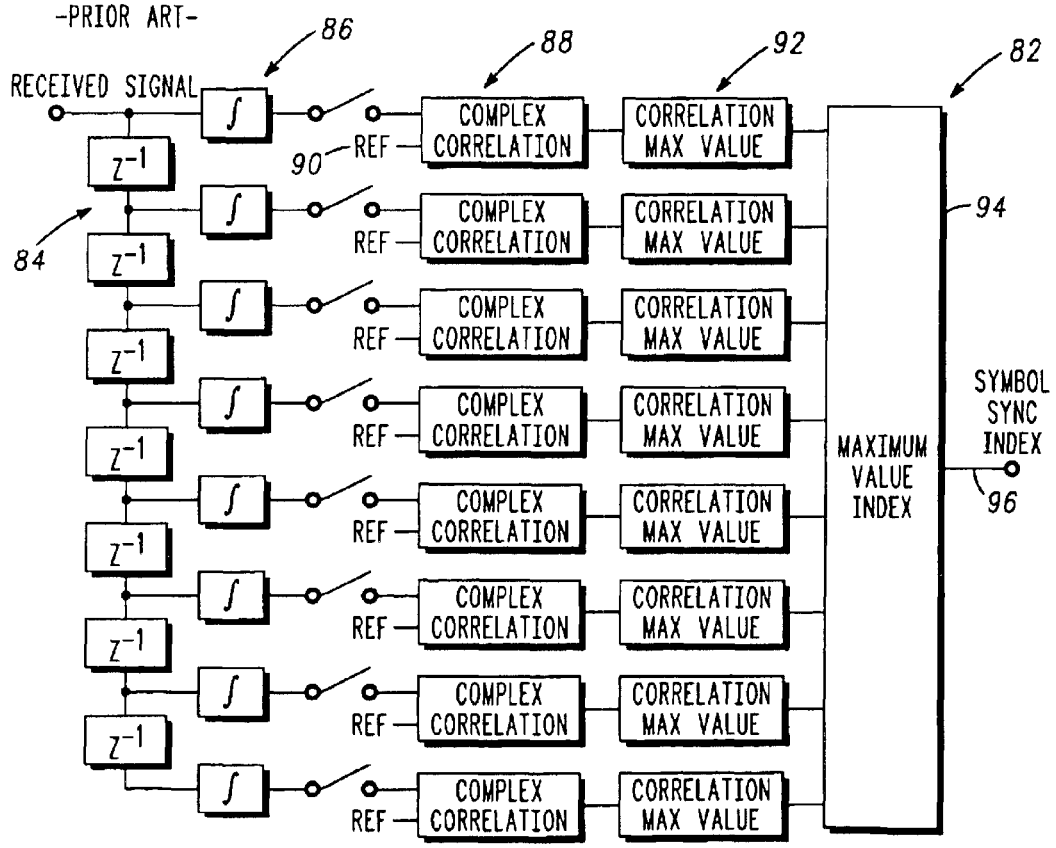
FIG. 4 is a block diagram of a prior art symbol synchronizer.

Specifically, FIG. 4 illustrates a conventional symbol synchronizer 82 for estimating digital waveform symbol boundaries. The symbol synchronizer 82 is software-implemented and is preferably programmed into processors in the digital modems 48–54, the ADCs 32–38, the DACs 56–62, or in offline processors (not shown). The symbol synchronizer works well in low SNR environments, is capable of a variety of symbol synchronization modes and, in its most robust form, can be used in a data aided applications where the transmitted waveform has a known header, or preamble. The symbol synchronizer 82 includes a delay block 84 for delaying a received waveform signal from 0 samples to 7 samples in a system in which each modulation symbol includes 8 samples. The symbol synchronizer 82 also includes integrators 86 for match filtering each of the 8 delayed signals, a complex correlator block 88 for performing a complex correlation of each of the eight filtered signals with a correlation reference input at 90 into each of the correlators in the correlator block 88 for digital-to-analog (DA) applications, and a correlator maximum value block 92 for choosing a path index from the complex correlator block 88 that has the highest correlator value based on a maximum value index for output to a maximum value index register 94 and then to a synchronizer output 96.

Figure 5:
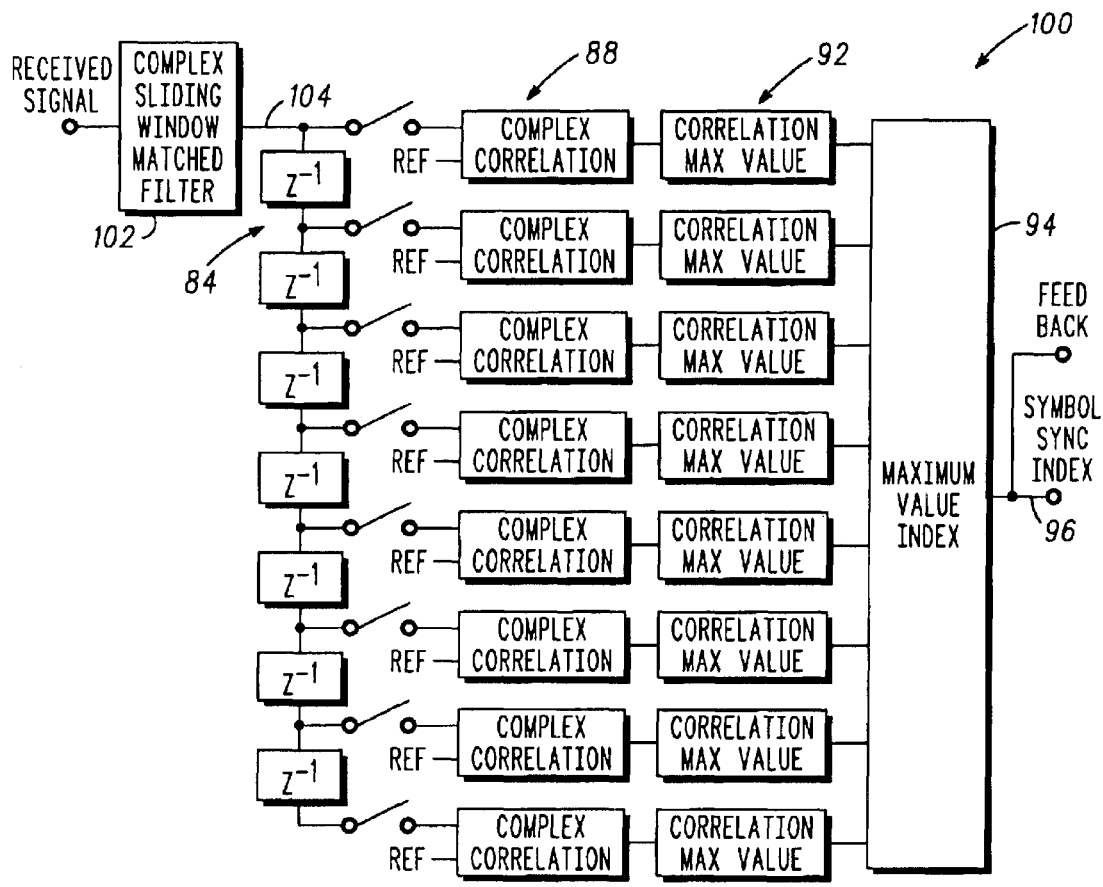
FIG. 5 is a block diagram of a symbol synchronizer according to a preferred embodiment of the present invention.

FIG. 5 shows a symbol synchronizer 100 according to a preferred embodiment of the present invention that is utilized in both pre- and post-detection processing implementations. The symbol synchronizer 100 is less complex than the prior art symbol synchronizer 82, as it simplifies the baseline algorithm of the symbol synchronizer 82. Consequently, it has minimal impact on processing complexity at a diversity receiver, such as the channel RF/IF receivers 24–30, while at the same time it improves symbol boundary estimation accuracy estimation time. The symbol synchronizer in accordance with the present invention is not limited to a system with modulation symbols having 8 samples per modulation symbol, but applies to modulation symbols having a wide range of samples per symbols such as, for example, 1 to 10960 symbols.

The symbol synchronizer 100 includes the same basic software-implemented components as the symbol synchronizer 82, except that a modified integrator configuration formed from a single complex sliding window matched filter (CSWMF) 102 is used rather than the integrator block 86. The CSWMF 102 has the same identical output as in the baseline algorithm of the integrator block 86. However, the CSWMF 102 is capable of generating this output with significantly less complexity. Further, the CSWMF 102 provides the flexibility to implement any desired matched filtering function based on the desired waveform transfer function characteristics. The mode of the CSWMF 102 can be chosen to provide a "sliding" estimate of the last N samples received, where N is a parameter-set value, to therefore augment receiver noise out of the received digital signal. In addition, as will be described later, the symbol synchronizer utilizes feedback at the synchronizer output 96 in both pre- and post-detection systems to correct phase/delay errors in each of the radio channels.

Nominal operation of the CSWMF 102 provides a digitally sampled matched filtering function with the programmed set of filter coefficients matched to the desired signal. An equivalent input/output relationship can be written for the CSWMF as $$CSWMF(n) = \xi CSWMF(n-1) + (1/N)(\alpha x(n) - \gamma x(n-N)), \quad (1)$$

where $\xi$ is a complex valued filter tap weight vector, $\alpha$ and $\gamma$ are the respective complex valued tap weights, $x(n)$ is the input to the CSWMF at time "n," and N is the CSWMF filter length and is also equal to the number of samples per modulation symbol.

Under many conditions, it is preferable, without loss in performance, to represent the filter as a discrete integrator matched to the modulation symbol boundaries. In this case Eq. (1) simplifies to $$CSWMF(n)=CSWMF(n-1)+(1/N)(x(n)-x(n-N)). \quad (2)$$

When the output of the CSWMF 102 is sampled at the appropriate times, the output is matched to the desired demodulation estimates of the transmitted waveform.

The symbol synchronizer 100 preferably uses a non-data aided (NDA) synchronization approach to reduce receiver memory requirements, and to potentially improve performance in the presence of potential signal degradation phenomena such as Doppler shift and frequency offsets. However, as shown in FIGS. 1 and 2, it is also contemplated that the symbol synchronizer 100 may be used with a DA approach where a known reference pattern is used. In such an alternate embodiment, the complex correlator performs a cross correlation between the input signal and the reference pattern.

In accordance with a preferred embodiment of the present invention, the correlation reference input at 90 into each of the complex correlators of the correlator block 88 is a self-reference, and is generally considered to be an autocorrelation estimator. This is equivalent to taking a power measurement at various delays from the output 104 of the CSWMF 100. The output 104 of the CSWMF 100 is sampled with the frequency associated to the length N and is represented by $CSWMF_N(n)$.

In the preferred embodiment of the present invention, the symbol synchronizer 100 also differs from the symbol synchronizer 82 in that the correlation maximum value block 92 averages the output, or power, of the correlator block 88 over 16 symbols. This 16 symbol length is preferred as associated memory requirements are relatively low, and as a sufficiently low mean square error for timing estimation is provided. However, other averaging lengths (longer or shorter) can be used based on the desired synchronization performance and estimation time requirements.

As mentioned above, the complexity of the symbol synchronizer 100 is minimized. This is because a zero-lag correlator of the output of the CSWMF 102 is used. The correct time index is chosen according to the following equation:

$$CSWMF_{sample\ instant}=T=\text{argmax}(CAP), \quad (3)$$

where CAP is the equivalent zero-lag autocorrelation estimate (complex power averaged over P symbols) defined by $$CAP(j)=CAP(j-1)+(1/P)(CSWMF_N(j).-CSWMF_N(j-P)), \quad (4)$$

where $CSWMF_N(j)$ is the output of the CSWMF at every N sample set, and P is the CAP averager length, which is 16 in the preferred embodiment. Index j is incremented every N samples out of the CSWMF or every Nth sample out of the CSWMF is input into each correlator block 88.

Figure 6:
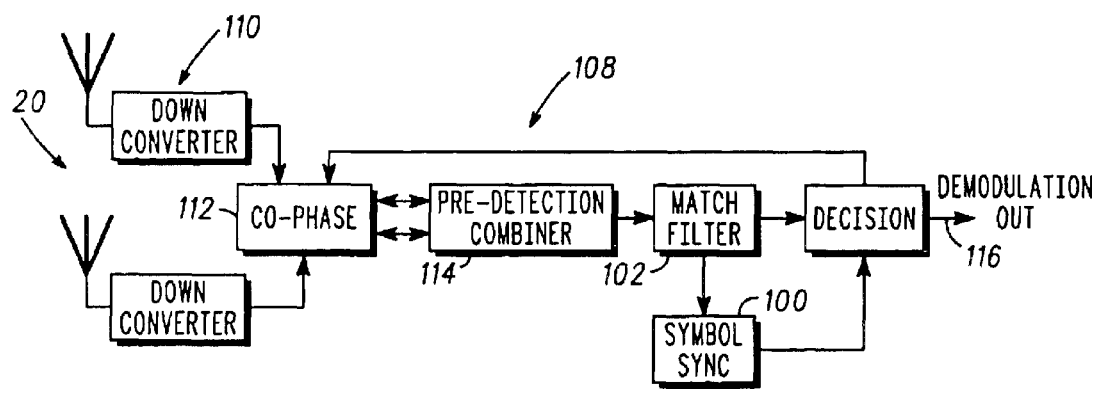
FIGS. 6 and 7 are block diagrams of a pre-detection combining receiver including the integrated symbol synchronizer shown in FIG. 5.
Figure 7:
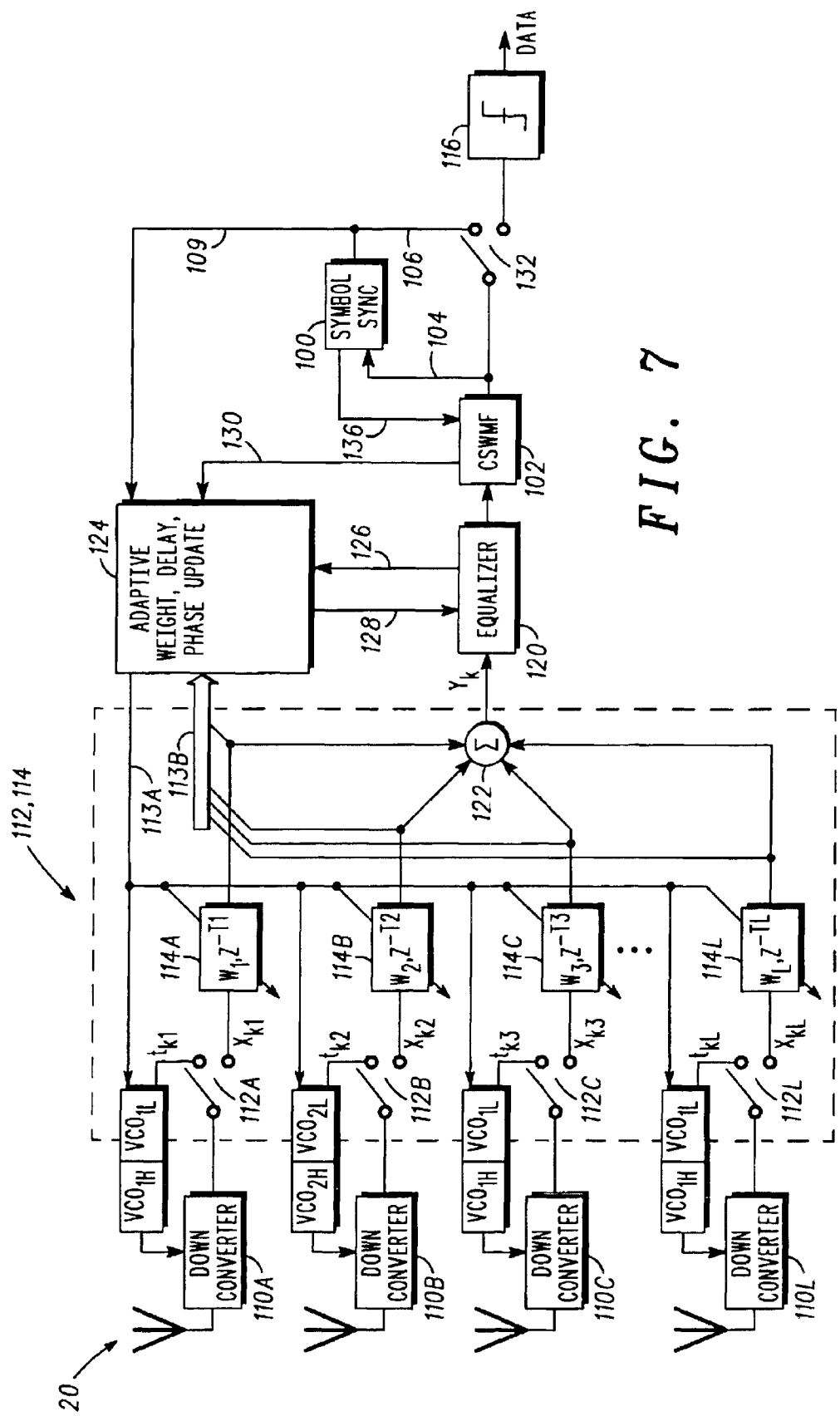

Referring now to FIGS. 6 and 7, implementation of the symbol synchronizer according to a preferred embodiment of the present invention will now be described. As shown in FIG. 6, the symbol synchronizer 100 is implemented along with the CSWMF 102 and other software-implemented pre-detection combining components in a pre-detection signal combining system 108 via processors in the digital modems 48–54, the ADCs 32–38, the DACs 56–62 or in offline processors (not shown). The system 108 estimates or approximates both the signal and interference-plus-noise levels for signals received by each element in the antenna array 20. In addition, the system 108 co-phases the antenna element outputs for maximal-ratio and equal-gain combining purposes to improve the performance of symbol boundary estimates and to reduce processing complexity that would be associated with conventional spatial digital signal diversity processing.

The system 108 following the downconverter in each channel is a baseband version of the pre-detection and co-phasing function programmed into a pre-detection diversity receiver such as the receivers 24–30. However, the system 108 could also be easily implemented at the antenna element outputs by converting the digital voltage controlled oscillators (VCOs), samplers, and delay elements to the analog signal domain. The system 108 also integrates the ability to compensate for large relative delays between each of the received antenna signals, such as when the relative delay is a respectable percentage of the baseband modulation symbol duration when a large spacing distance is utilized between each of the antenna elements in the array 20, and for large multipath delay spreads.

Waveforms received at the antenna array 20 are respectively input into and downconverted to baseband frequency by downconverters 110a–110d. The respective phases of the downconverted waveforms are then equalized by a co-phasing circuit 112 before the waveforms are combined by a pre-detection combiner 114. The combined co-phased signals are then filtered by the CSWMF 102 before being output to the symbol synchronizer 100. In addition, a symbol boundary confidence measure is output to the co-phasing circuit 112 via closed feedback loops 109, 113a to correct phase/delay errors in each channel. Sampled signals at the output of weight/delay compensation blocks 114a–114L are formed into a vector to be processed in an adaptive weight/delay/phase update block 124 and subsequently passed through via line 128 to the equalizer 120 for channel estimation purposes on each channel if needed. This allows the equalizer 120 to perform both independent channel estimation from sampled signals output from weight delay blocks 114a–114L and/or the combined signal channel estimation from the combined signal from 122 or $y_k$.

Still referring to FIG. 7, line 126 provides a vectorized signal from the equalizer 120 to the adaptive weight/delay/phase update block 124 such that channel samplers 112a ($t_{k1}$)–112L($t_{kL}$) and weight delay blocks 114a–114L, providing signal weights $w_1$–$w_L$ and delays $z^{-T1}$–$z^{-TL}$, can be correctly adjusted independently on each receive channel. The analog signals from downconverters 110a–110L are sampled by samplers 112a–112L ($t_{K1}$–$t_{KL}$), in the co-phasing circuit, with each being adjustable with variable sampling phase and sampling frequency. The digitally sampled signals output from the samplers 112a–112L are passed through the respective weight delay blocks 114a–114L. The variable delays $z^{-T1}$–$z^{-TL}$ within the weighting elements 114a–114L are used to compensate for large variable relative time delays between signals arriving into each of the respective antenna elements of the antenna array 20. The complex gain weights ($w_1$–$w_L$) are used to correct for any leftover distortions due to the transmission channel and potentially any leftover fine phase misalignments from previous processes.

Once the symbol synchronizer 100 synchronizes the signals as discussed above, it outputs the control signal to a decision block 116, where the output is demodulated as a result of selecting only the desired samples from an output of the CSWMF 102. The demodulated output represents an estimate of the transmitted symbol. The symbol synchronizer 100 maximizes the demodulated output SNR by signaling the decision circuit when to appropriately accept the output from the CSWMF 102. With the present invention, the feedback loop from the CSWMF 102 to the co-phasing circuit 112 also maximizes the demodulated symbol SNR. Specifically, a feedback loop between the CSWMF 102 and the co-phasing circuit 112 incrementally improves the equalizer function by utilizing the matched filter output via a confidence measure (metric) from the symbol synchronizer 100. A line 106 between the symbol synchronizer 100 and a sampler 132 provides the control signal with the purpose of indicating which output samples from the CSWMF 102 to send to the decision block 116. A line 130 between the CSWMF 102 and the adaptive weight/delay/phase update block 124 provides data to the adaptive weight/phase/delay update block 124 and through to the equalizer 120 via line 128, with the data being a replica of the data between the sampler 132 and the decision block 116. The samples that are output from the CSWMF 102 to the adaptive weight/delay/phase update block 124 are controlled via a line 136 that functions in a manner as the line 106 between the CSWMF 102 and the sampler 132. The feedback line 130, which is similar in function to the confidence measures $cm_w$ and $cm_1$, improves the error convergence accuracy and speed of the equalizer 120.

It should be noted that the co-phasing circuit 112 is implemented for both maximal-ratio and equal-gain combining to ensure coherent voltage addition to the waveforms received by the elements in the antenna array 20. For completely correlated antenna fading, perfect co-phasing may still provide a coherent combining gain for the desired signal equal to the number of elements in the array 20 if the interference-plus-noise at each element is statistically independent.

Also, as any relative delay and carrier offset must be removed if the signal combining process is to be even close to optimal, the combiner 114 is designed to estimate the relative delay and carrier phase between each signal at each antenna element, to provide estimates of the complex channel gain of each channel, and to use this estimated delay and channel information to appropriately weight and delay the signal in each channel prior to combining the signals.

Referring to FIG. 7, the system 108 of FIG. 6 is shown in more detail (FIG. 7 does not show carrier recovery and frequency offset estimation circuitry necessary for coherent demodulation and optimal down-conversion, respectively. However, such techniques are well known in the art). As shown, the co-phasing circuit 112 includes processing blocks $VCO_{1H}$–$VCO_{LH}$ (L=the number of elements in the array 20) for down-converting signals received by the antenna array 20 from RF/IF to baseband, and for taking inputs from a frequency estimation circuit (not shown) to correct for any frequency offset and Doppler shift between transmitted and received waveforms. The co-phasing circuit 112 also includes processing blocks $VCO_{1L}$–$VCO_{LL}$ for providing optimal digital sampling of the outputs of the down-converters 110. The blocks $VCO_{1L}$–$VCO_{LL}$ can be individually controlled for each channel to provide optimal sampling on each channel, and can be used to ensure coherent waveform combining at the pre-detection combiner 114. The co-phasing circuit 112 utilizes weights $W_n$ that may be complex weights to provide maximal-ratio combining, if desired, or common value weights for equal-gain combining purposes. Further, delay blocks $z^{-T_1}$–$z^{-T_L}$ are used to adjust any large or small residual relative delays and phase differences that may exist prior to the combining operation implemented at 122.

The system 108 also includes an equalizer 120 to estimate the channel response in a combined and independent fashion for each channel signal for maximal ratio combining. As mentioned above, large delays may require compensation for large antenna spacings. The equalizer 120 is used to provide channel estimates, if required, and remove channel effects prior to the signals being filtered by the CSWMF 102.

Preferably, a Constant Modulus Algorithm (CMA) is utilized as the equalizer, as it can estimate the amount of intersymbol interference (ISI) plus noise independently of carrier phase and signal constellation.

An adaptive weight, delay, and phase updating block 124, which is preferably implemented by a blind algorithm, can be used for joint clock recovery and baseband combining to provide signal equalization and adaptive weight, delay, and phase updating.

The system 108 also includes feedback interaction between the CSWMF 102 and symbol-synchronizer the output CAP(j) as determined by Eq. (4) of the correlator 92, and between the equalizer 120 and adaptive weight, delay, and phase update block 124. Processing in the adaptive weight/delay/phase update block 124 improves system operation by estimating RF carrier phase and frequency differences and by estimating complex weights on each receive channel. Digital sampling accuracy is improved through the signal processing function of the adaptive weight/delay/phase update block 124. By providing feedback from the symbol synchronizer 100 from the complex correlator CAP output 92, lower equalizer estimation error is achieved in the channel estimation process. Each signal processing estimate in the adaptive weight/delay/phase update block 124 can be adaptively adjusted by using the confidence measure output from the symbol synchronizer 100, with the confidence measures being calculated according to $$cm_w = c_w / CAP(j) \tag{5}$$

and $$cm_t = c_t / CAP(j) \tag{6}$$

where $c_w$ and $c_t$ are empirical constants determined through experimentation. Performance experiments are run to find the best overall values for $c_w$ and $c_t$ to provide the best overall combination of minimum convergence error and speed for Eqs. (7) and (8) below.

The output of the symbol synchronizer 100 is used to provide a variable step size according to the likelihood or confidence measures $c_w$ and $c_t$ of correct symbol boundary estimation. The CMA update equations for the combiner weights and sampling phase for an L=2 diversity system are $$\underline{w}^{(k+1)} = \underline{w}^k - cm_w \gamma_w \epsilon_{pq(k)} \underline{x}^*_k \tag{7}$$

$$\underline{t}^{(k+1)} = \underline{t}^k - cm_t \gamma_t Re[\epsilon_{pq(k)}^* \text{diag}\{w^*_1, w^*_2\} \underline{\dot{x}}_k^*, \tag{8}$$

where $\gamma_w, \gamma_w$ are the step-size parameters, and, as discussed: above, $cm_w, cm_t$ are the confidence measures from the symbol synchronizer used to provide variable step size and $\underline{w} = [w_1 \ w_2 \ w_3 \ldots w_L]$, for example, as $c_t$ is the variable step size parameter for optimum sampling in Eq. (8), and $c_w$ is the variable step size parameter for complex channel gain convergence in Eq. (7). It should be noted that Eq. (7) represents the update equation for the complex channel gain of each receive channel 114a–114L, and Eq. (8) represents the update equation for optimum sampling on each of the receive channels 112a–112L. A higher confidence measure results in a smaller step size being utilized (thus smaller $cm_w, cm_t$) to ensure that the convergence algorithm does not over-step the desired solution. A lower confidence measure, and thus larger $cm_w, cm_t$, results in a larger step size being utilized to provide a more rapid convergence from initial algorithmic startup. Other relevant parameter definitions include $\underline{\dot{x}}_k = [\partial x_{k1}/t_1 \partial x_{k2}/t_2]^T$; and when p=2, q=2, the error signal $\epsilon_{pq(k)}$ is given by $$\epsilon_{22(k)} = y_k(|y_k|^2 - \delta_2), \tag{9}$$

while the CMA$_{2\text{-}1}$ leads to $$\epsilon_{21(k)} = y_k \text{sign}(|y_k|^2 - \delta_2),  \quad (10)$$

where $y_k$ denotes the $k^{th}$ signal sample at the combiner output and $\delta_p$ is a scaling factor. It should be noted that the corresponding class of algorithms is referred to as the CMA p-q, for p and q positive integers, which minimizes the general CMA cost function $J_{pq}$ defined as $$J_{pq} = E\{||y_k|^{p-\delta}_p|\}  \quad (11)$$

Figure 8:
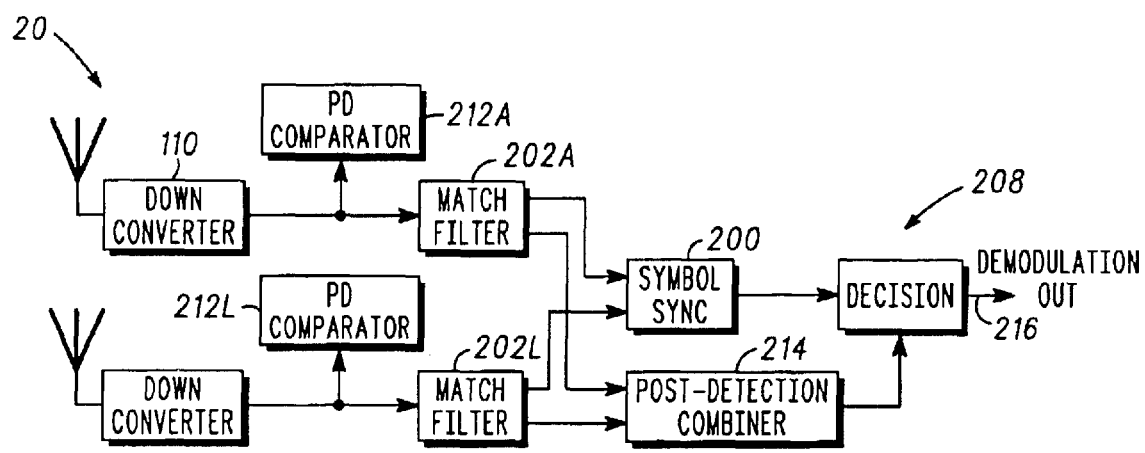
FIGS. 8 and 9 are block diagrams of a post-detection combining receiver including the integrated symbol synchronizer shown in FIG. 5.
Figure 9:
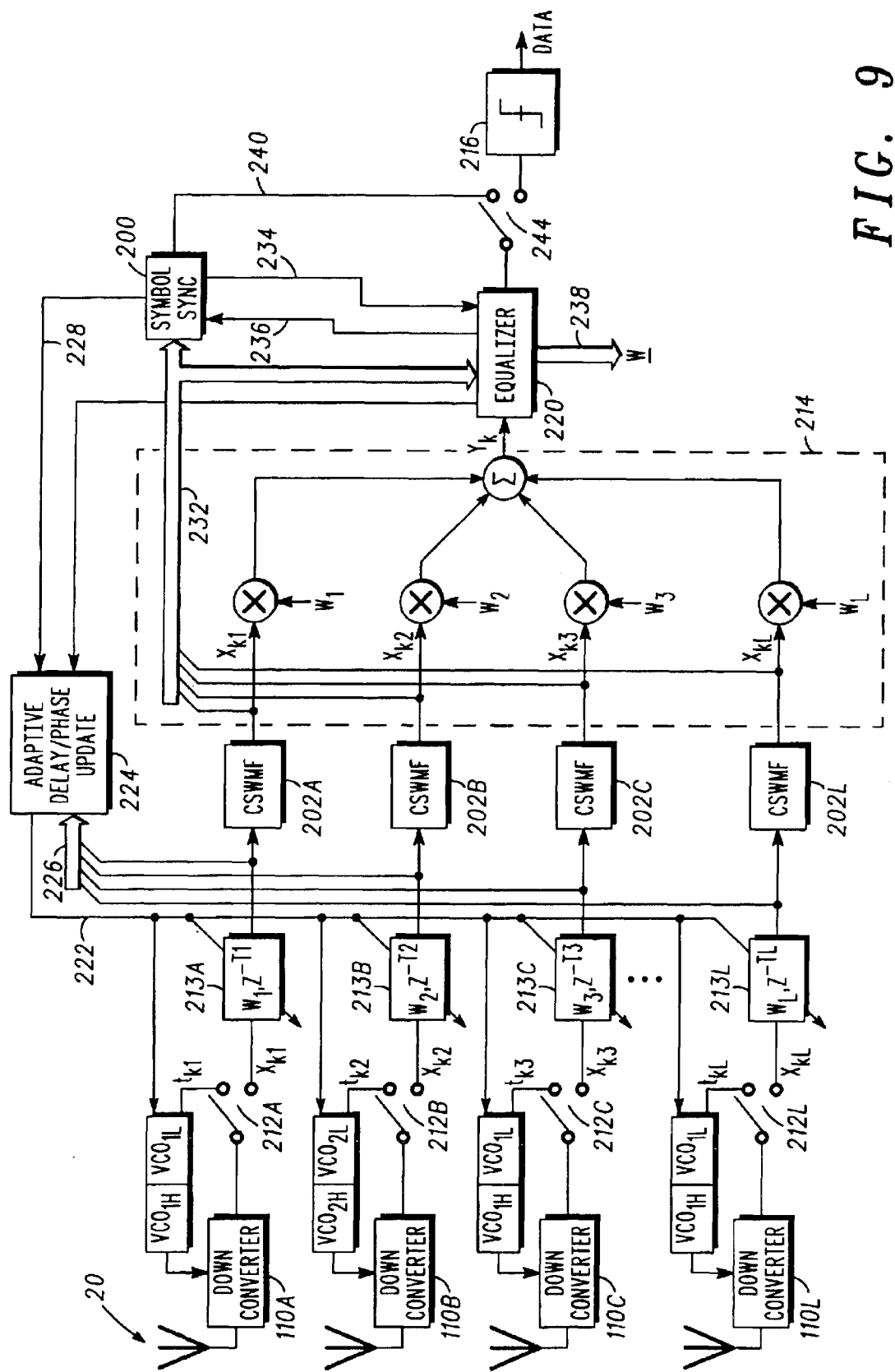

With reference now to FIGS. 8 and 9, implementation of a symbol synchronizer in a post-detection signal combining system 208 according to another preferred embodiment of the present invention will now be described. The post-detection combining system 208 includes many of the same components as the pre-detection combining system 108. However, a symbol synchronizer 200 is implemented along with multiple CSWMFs 202a–202L, rather than the single CSWMF 102 in the pre-detection combining system. Post-detection combining components, including a post-detection combiner 214, utilize channel estimation, and if necessary, multipath signal delay adjustment. As with the pre-detection signal combining system 108, the post-detection combining system 208 does not show details regarding well known carrier recovery and frequency offset estimation necessary for coherent demodulation and optimal down-conversion, respectively.

Operation of the pre- and post-detection combining systems 108, 208 differ in two primary ways—the manner in which optimum sampling and combiner weight equations are executed, and the manner in which a variable step size is executed. Regarding the manner in which optimum sampling and combiner weight equations are executed, for the pre-detection signal combining system 108, an optimum sampling and combiner weight update Eqs. (7) and (8) are both executed in the equalizer 120 using the CMA cost function. For the post-detection combining system 208, the optimum sampling update equation operating on the elements 212a–212L must be executed at the digital sampling interval prior to operation of the CSWMFs 202a–202L if coherent demodulation is desired. By executing the optimum sampling update equation prior to the match filtering operation, the post-detection system 208 will provide optimum sampling for each channel prior to post-detection combining. The sampling time update Eq. (8) is performed in the adaptive delay/phase update block 224 and passed to the samplers 212a–212L via a line 222, and the combiner channel weight update Eq. (7) is performed in the equalizer 220 as in the pre-detection signal combining system 108 and is passed to the post-detection combiner via line 238.

Regarding execution of the variable step size equation, the post-detection combining system 208 realizes a variable step size through the symbol synchronizer 200 which provides the cm$_t$ parameter to the adaptive delay/phase update block 224 via a line 228 and the cm$_w$ parameter to the equalizer 224 via a line 234 to achieve optimal sampling and combiner weights. In the pre-detection combining system 108, both cost functions are provided to the equalizer 120 as shown through the adaptive weight, delay, phase update block 124 from the line 109 and is passed to the equalizer 120 via the line 128. The CSWMF outputs 202a–202L ($x_{k1}$–$x_{kL}$) form an L length vector sent via a line 232 to both the symbol synchronizer 200 and the equalizer 200. The combiner signal output $y_k$ is passed to the equalizer 220 and through on the line 236 to the symbol synchronizer 200. The symbol synchronizer 200 can then perform symbol boundary estimation and produce confidence measures cm$_w$, cm$_t$ output on the line 228 independently for each receiver channel via the line 232 and/or for the combined signal $y_k$ via the line 236. The equalizer 220 can then perform channel estimation and produce complex channel gains $\underline{w}$ on the line 238 based on signals input from each receiver channel via the line 236 and/or on the combined signal $y_k$.

Since the waveform from each of the channels is optimally sampled by adjustable samplers 212a–212L and any significant relative delay also removed by the adjustable delay elements 213a–213L, the symbol synchronizer 208 is capable of providing a single optimum sampling interval at the output 216 via the control line 240 to the sampler 244 of the post-detection combining system, after the equalizer performs signal equalization, if necessary. Individual channel sampling phase delay and significant relative delay are monitored in the adaptive phase/delay/update block 224 through a vectorized line 226.

It should be noted that when the post-detection signal combining system 208 utilizes equal-gain combining, the complexity of the system 208 may be reduced by preferably eliminating the combiner channel weight update Eq. (4), and, potentially, the entire equalizer 220.

Figure 10:
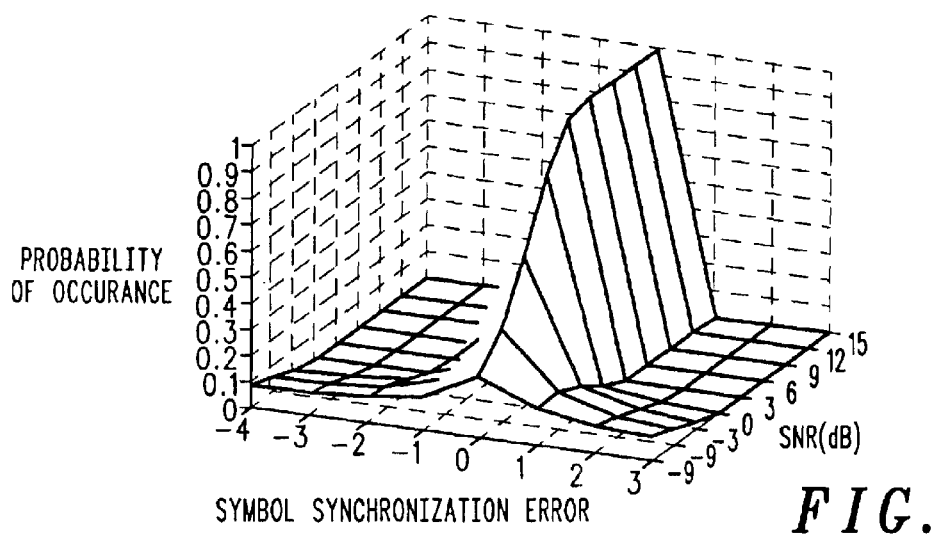
FIG. 10 is a graph of synchronization performance of the symbol synchronizer of the present invention vs. signal-to-noise ratio (SNR) and additive white Gaussian noise (AWGN) for an antenna array having a single element.

Results of experiments performed with the symbol synchronizer of the present invention according to the above embodiments will now be discussed. FIG. 10 shows the results of an experiment performed in an additive white Gaussian noise (AWGN) environment with no Rayleigh fading and no diversity (L=1). The graph shows a three-dimensional representation of the performance of the symbol synchronizer such as that used in both the pre- and post-detection combiner systems 108, 208. In this experiment, the algorithm processed 10,000 symbols at each SNR from −9 dB to +15 dB in steps of 3 dB. The simulation was designed to calculate the synchronization error between the correct and actual (receiver estimate) sample estimate. The probability of occurrence of each error value was then calculated and plotted as shown. The Z-axis in the plot indicates the probability of occurrence for each error estimate. Note that at SNR>6 dB the synchronizer chose the correct index more than 99.5% of the time. However, the synchronizer performed poorly at SNRs less than 0 dB.

Figure 11:
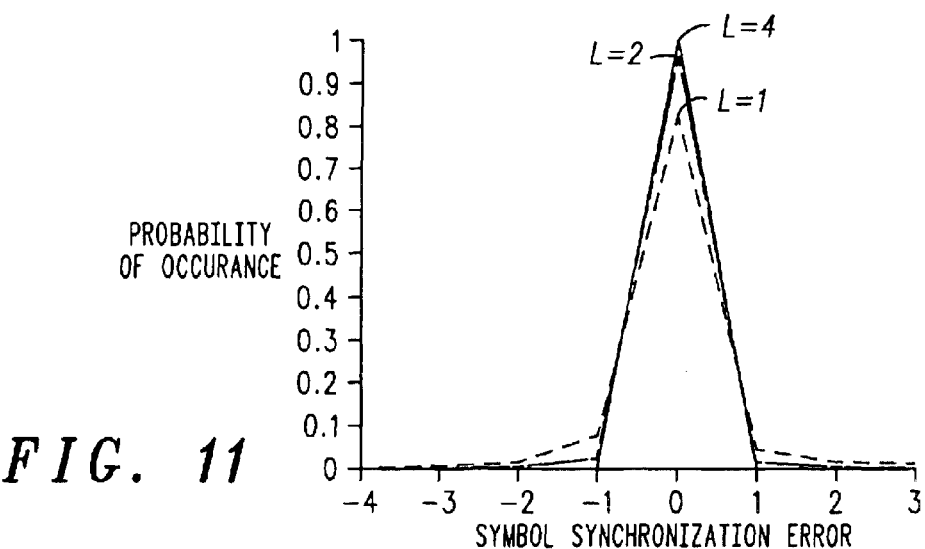
FIG. 11 is a graph of synchronization performance of the symbol synchronizer of the present invention vs. varying numbers of antenna elements at 0 dB in the presence of SNR and AWGN.

The AWGN model was then tested when the symbol synchronizer was integrated into a diversity receiver including a pre-detection equal-gain combining system such as that shown at 108 in FIGS. 6 and 7. The model was modified to use an antenna array having 1, 2 or 4 spatially separated elements (L=1, 2 or 4). FIG. 11 shows the improvement that can be gained by using diversity by illustrating the performance in an AWGN channel at 0 dB with pre-detection equal-gain combining for L=1, 2 and 4. With L=1, the probability of occurrence of correct synchronization was only 82.7%. For L=2, the diversity receiver exhibited a substantial improvement in synchronization performance of 96.3% correct timing estimation. For L=4, the symbol synchronizer chose the correct symbol boundary 99.7% of the time. Even with an estimation error of ±1 sample, a radio demodulator (not shown) should exhibit little degradation in bit error rate (BER) performance.

Figure 12:
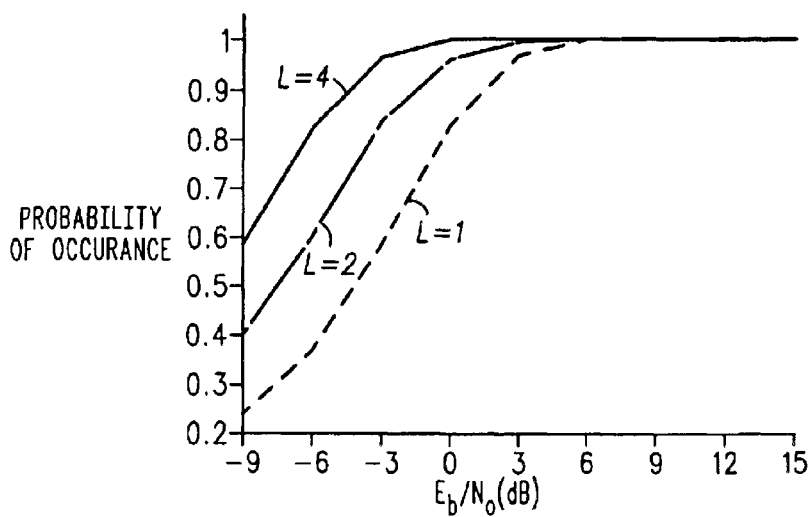
FIG. 12 is a graph of optimal sampling probability of the symbol synchronizer of the present invention as a function of SNR in an AWGN environment using pre-detection equal-gain combining.

FIG. 12 graphically illustrates the probability of optimal sampling for the symbol synchronizer as a function of SNR in an AWGN environment using pre-detection equal-gain combining. As is evident from the graph, diversity offers substantial improvement in an uncorrelated AWGN environment.

Figure 13:
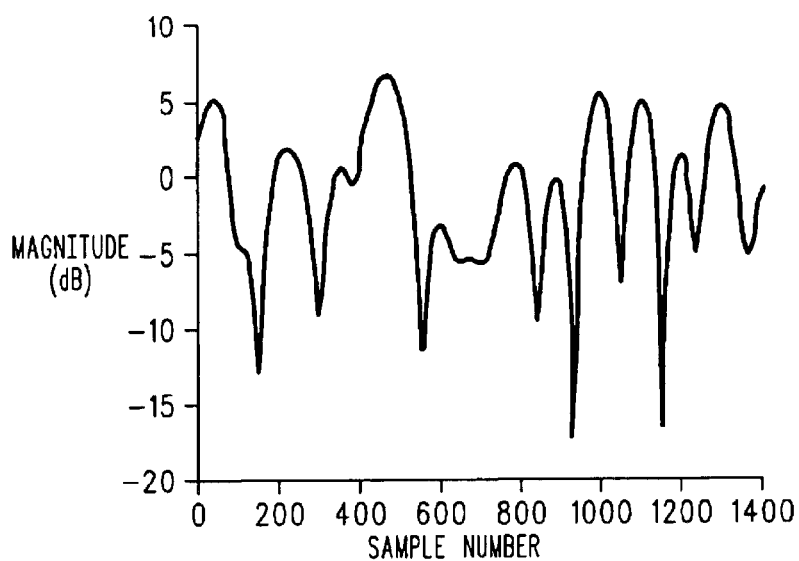
FIG. 13 is a graph of Rayleigh fade magnitude vs. number of digital signal samples.
Figure 14:
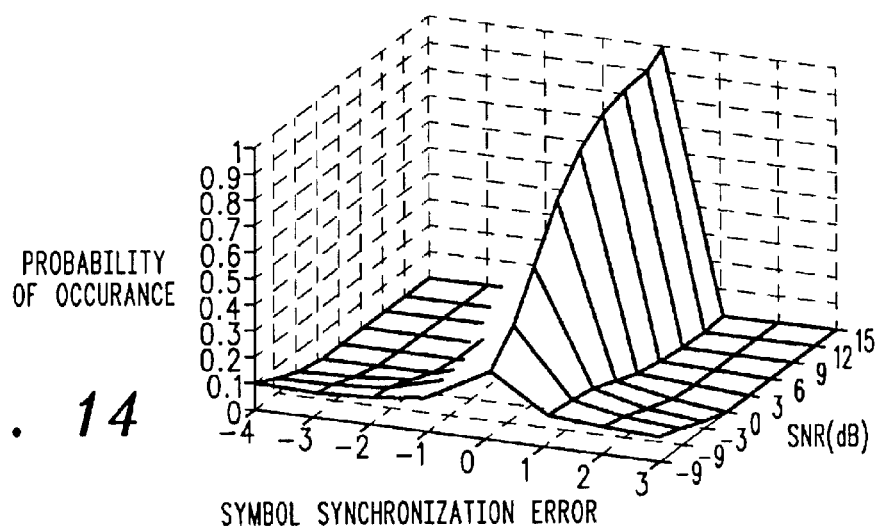
FIG. 14 is a three-dimensional graph of the performance of the symbol synchronizer vs. AWGN noise and slow Rayleigh fading with one antenna element.

FIG. 13 shows the results of an experiment in which slow Rayleigh fading was added to the above-discussed simulation model. It was assumed that the slow Rayleigh fading was constant over a symbol duration such that the phase shift due to the fading can be corrected, or that the data rate was sufficiently high so that the phase shift was approximately constant over a symbol duration. FIG. 14 is a three dimensional representation of the performance of the symbol synchronizer with AWGN noise and slow Rayleigh fading.

Compared with the graph shown in FIG. 10, which shows synchronizer performance in AWGN noise, the performance of the symbol synchronizer exhibited faster rolloff in the experiment including Rayleigh fading.

Figure 15:
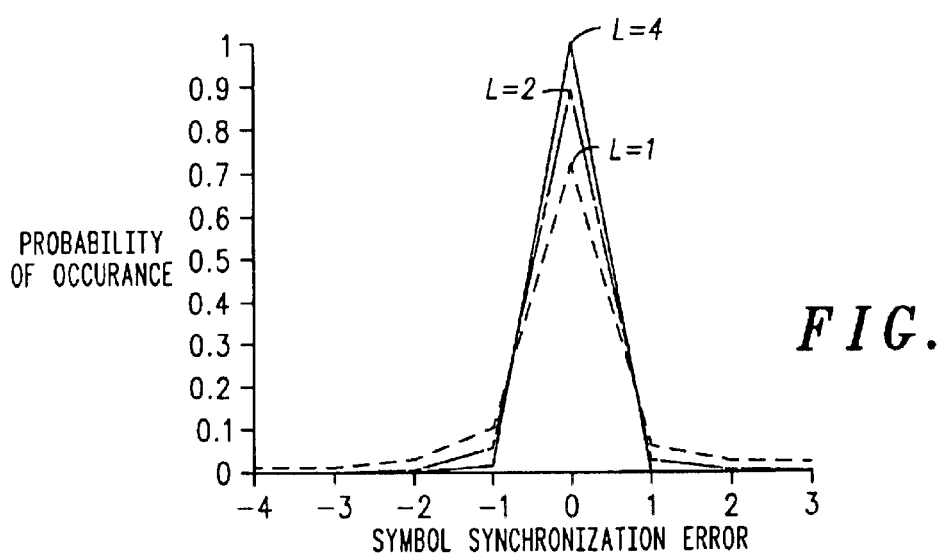
FIG. 15 is a graph of the performance of the symbol synchronizer using pre-detection equal gain signal combining with slow Rayleigh fading at 0 dB.

FIG. 15 graphically illustrates symbol synchronizer performance using pre-detection equal-gain combining with slow Rayleigh fading at 0 dB. Performance of the synchronizer with slow Rayleigh fading dropped to 72.1% at 0 dB. In most situations, such performance would be inadequate. However, by adding an additional antenna element (L=2), the performance increased to 89.8%. For the case of L=4, the performance jumped to 97.9%.

Figure 16:
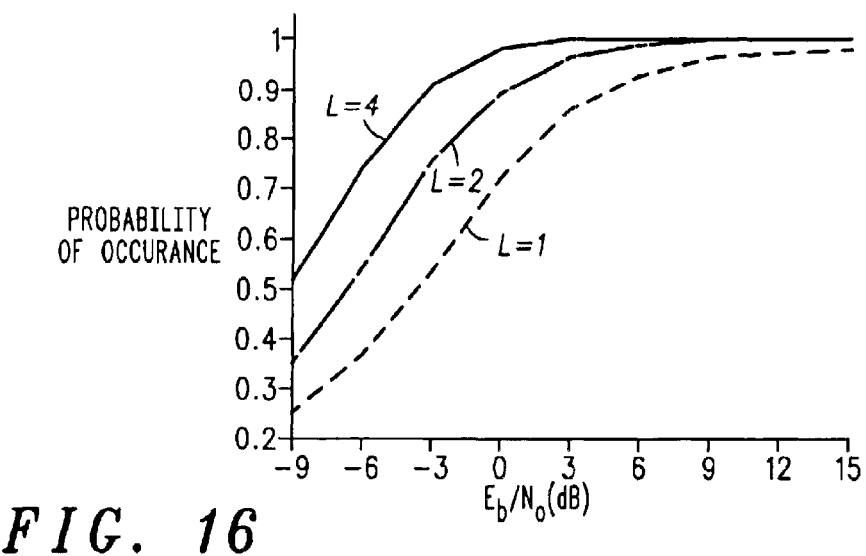
FIG. 16 is a graph of the performance of the symbol synchronizer using pre-detection equal gain signal combining with slow Rayleigh fading as a function of SNR for one, two or four antenna elements.

FIG. 16 graphically illustrates the performance of the symbol synchronizer using pre-detection equal-gain combining with slow Rayleigh fading as a function of SNR. Compared with FIG. 12, synchronizer performance with Rayleigh fading plus AWGN noise with L=2 surpassed the performance with no diversity in AWGN noise (FIG. 8, L=1).

Figure 17:
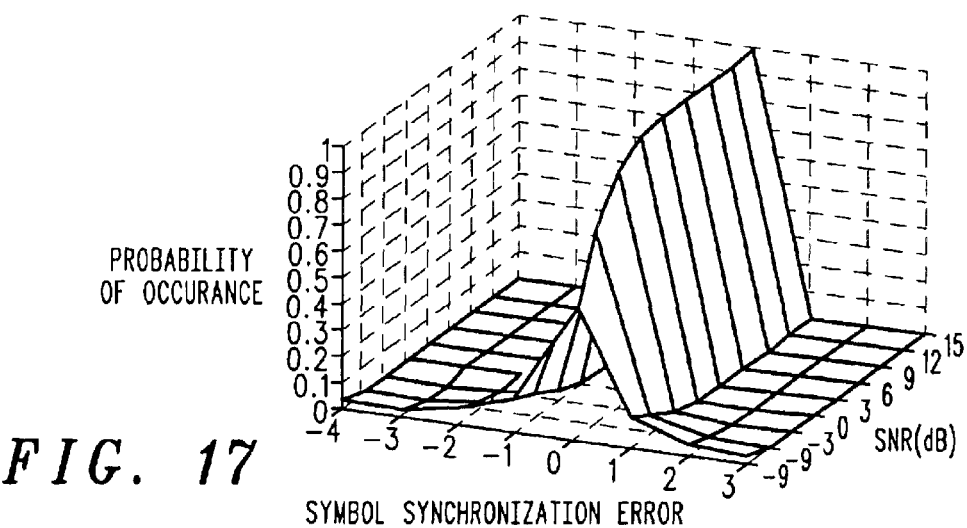
FIG. 17 is a three-dimensional graph of the performance of the symbol synchronizer with AWGN noise and slow Rayleigh fading when the number of antenna array elements equals four.

FIG. 17 is a three dimensional representation of the performance of the symbol synchronizer with AWGN noise and slow Rayleigh fading in the case of L=4. Compared with the non-diversity case in AWGN noise shown in FIG. 10, it should be noted that diversity with L=4 in slow Rayleigh fading far surpassed the performance of the synchronizer in the non-diversity AWGN experiment.

Figure 18:
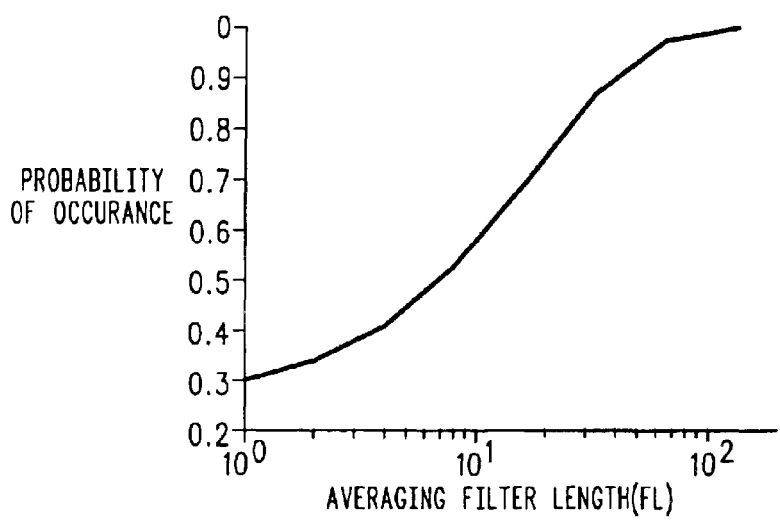
FIG. 18 is a graph of the performance of the symbol synchronizer as a function of averaging filter length for a single element antenna at an SNR of 0 dB with flat Rayleigh fading.

In addition to the benefits afforded by integrating a symbol synchronizer into a pre- or post-detection diversity signal combining system as discussed above, additional benefits include the reduced time required by such systems to synchronize, as well as the lower computational complexity of such systems. FIG. 18 shows the performance of a symbol synchronizer according to the present invention as a function of the averaging filter length (FL) for the non-diversity case (L=1) at an SNR on 0 dB with flat Rayleigh fading, and illustrates that the length requirement of the averaging filter for a system with L=1 is much greater than the length required when only 1 additional antenna element is used for spatial diversity purposes. For example, for the case of L=2 at 0 dB with FL=16 in FIG. 15, the probability of correct synchronization is 0.8984. This corresponds to an averaging filter length of approximately FL=40 for the non-diversity (L=1) case. Thus, by implementing spatial diversity with two antenna elements (L=2), a reduction in averaging filter latency (40/16) of better than two to one can be achieved while at the same time reducing the complexity of the averaging filter. The averaging filter latency and complexity drop even more when compared with the diversity case of L=4. FIG. 15 shows the probability of correct synchronization is 0.9791 for L=4. This corresponds to a non-diversity averaging filter length of FL=70. Thus, the averaging filter latency and computation complexity drops by a factor of over 4 (70/16).

Figure 19:
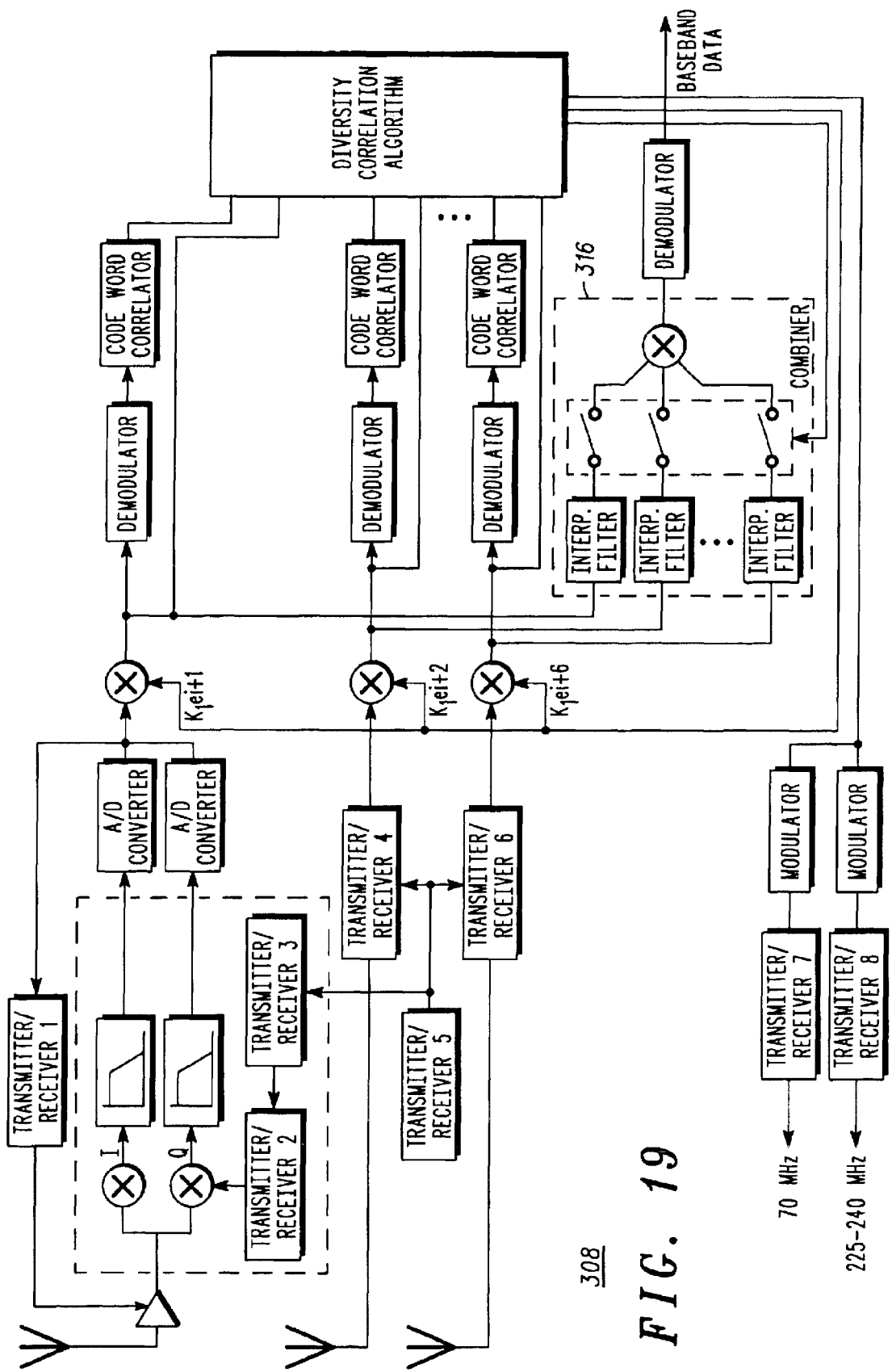
FIG. 19 is a block diagram of a pre-detection diversity system formed from two software defined radios of the type in which the symbol synchronizer is implemented.

FIG. 19 is a high level block diagram of a specific implementation of a pre-detection combining system 308 utilizing a 6 channel combiner 316 without RF phase shifters implemented in two current WITS 5004 radios, where one WITS radio provides 4 receivers and the second WITS radio provides 2 remaining receivers and 2 transmitters. The WITS direct down-conversion process places the image within the passband of the A/D digital image rejection filters. Phase and gain adjustment factors are computed by the diversity correlation algorithm and implemented digitally for a high degree of precision. A 70 MHz, 225–400 MHz, or other desired transmit frequency could be achieved by bridging the demodulated baseband data to any unused WITS channel.

Figure 20:
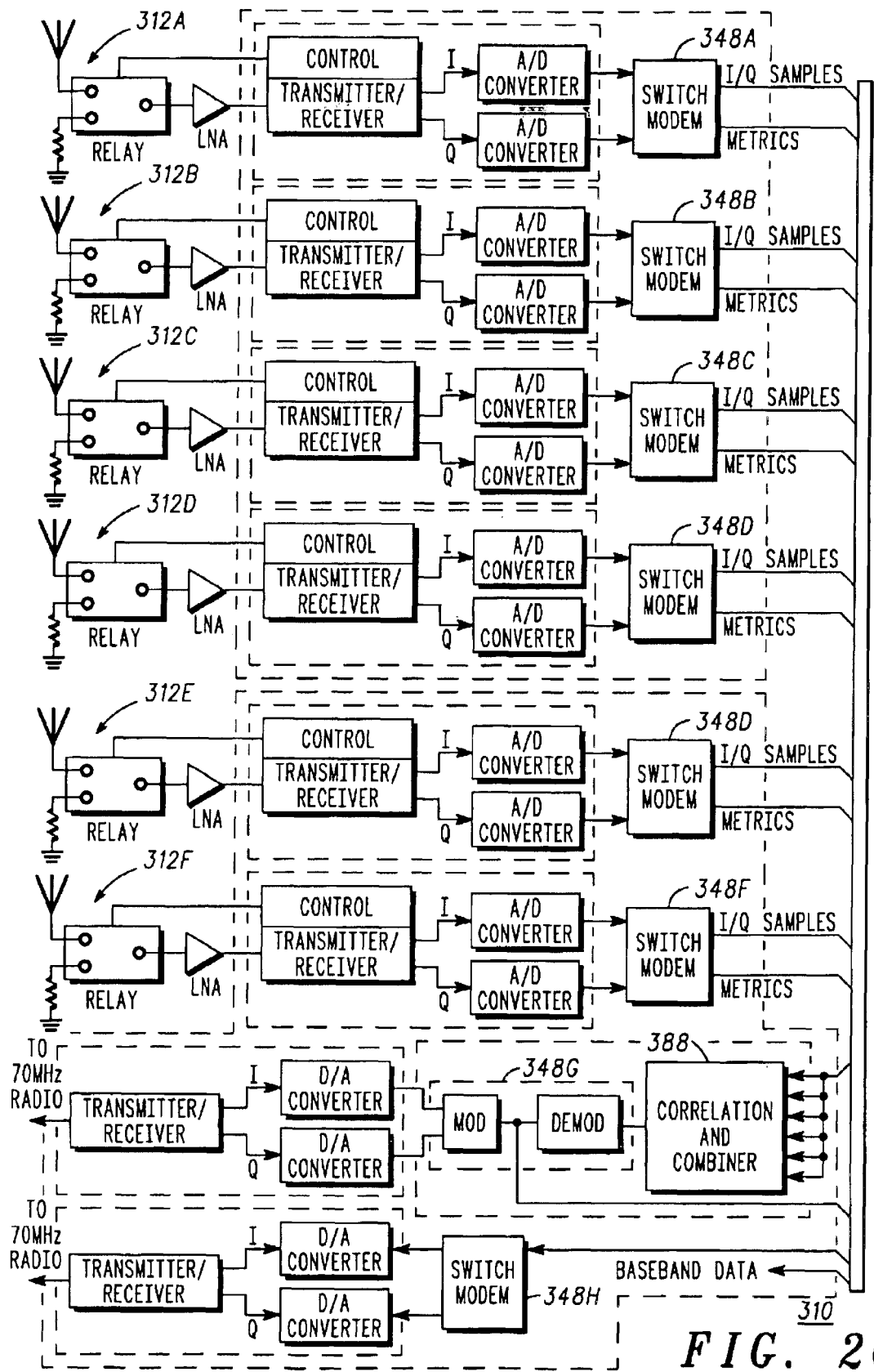
FIG. 20 is a block diagram of the multiple overlapped channels of the software defined radio shown in FIG. 19.

In FIG. 20, a block diagram 310 shows how the 6 channel receive combiner 316 using 2 WITS radios is partitioned. The WITS modems 348a–348f on 6 of the channels perform the demodulation and the correlator codeword search for each of the receive channels 312a–312f. A seventh WITS modem 348g performs correlation and diversity combining operations and the final demodulation, such as bipolar phase shift keying (BPSK), any M-ary-phase shift keyed (MPSK), -pulse position modulation (MPPM), -continuous phase modulation (MCPM), or -frequency shift keyed (MFSK) modulation could be used. The modems 348g or 348h can also serve as a transmitter to remodulate the combined baseband signal onto a carrier for output at IF, UHF. The synchronization correlator 388 can be used to refine the timing and channel estimation process.

Figure 21:
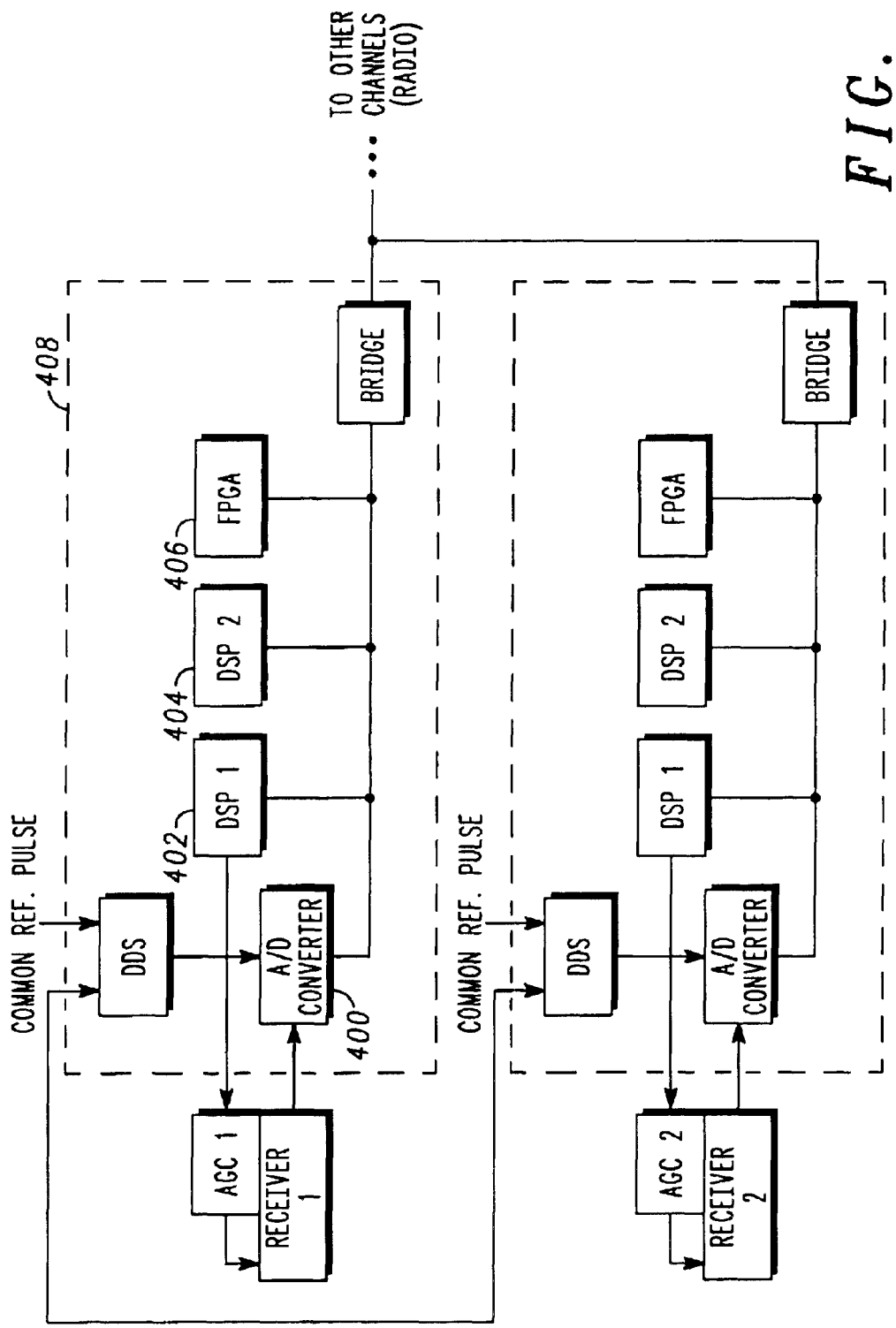
FIG. 21 is a block diagram of the modem and the inter-channel communication necessary for diversity combining in the software defined radio of FIG. 20.

FIG. 21 shows the basic structure of a modem such as the modem 348g. The modem includes an A/D converter 400, two DSP chips 402–404, and an FPGA processor 406. The modem components reside on a 6Ucompact PCI (6UCPCI) card 408. Communication paths (data and control) are all set up via a 32-bit 33 MHz PCI bus. A data word (D-Word) is comprised of I and Q samples having a maximum one-way transfer rate of approximately 16 Msamples/sec. Any data or inter-channel communication takes place through the bridging circuit to as many channels (or radios) as desired.

In view of the foregoing discussion, it should now be appreciated that the symbol synchronizer according to the present invention provides many advantages when integrated into a pre- or post-detection combining system in a multi-channel software defined radio. For example, the symbol synchronizer reduces overall radio signal processing complexity and provides high performance synchronization for a multi-channel software defined radio. Within the symbol synchronizer, the programmable CSWMF and complex average power (CAP) circuits can be tailored to new waveform requirements for filter coefficients and weighting techniques. In addition, the output of the CAP is used to update the equalizer channel estimator and optimum sampling update equations defined above by Eqs. (7) and (5). These new update equations can be utilized for both of the pre- and post-detection combining systems illustrated in the receiver system block diagrams of FIGS. 6-9.

In addition to the above-described applications, it is also contemplated that the integrated symbol synchronizer may be integrated into a multi-channel communications system to improve the performance of any digital waveform operating in a channel where the current performance is inadequate, or of adaptive-rate waveforms that change data rates frequently. The integrated symbol synchronizer may also be used to synchronize waveforms operating in blind channel environments to alleviating channel degradation, and to improve frequency hopping synchronization and channel estimation if required. The symbol synchronizer may also be utilized in any ad-hoc network of radios that are capable of utilizing multiple channels to gain channel access, and in conjunction with any system in which it is difficult to achieve synchronization of an ultra high data rate waveform. Finally, the symbol synchronizer may be utilized to synchronize any higher order constellation waveform, such as the waveforms used in air combat node (ACN) requiring a high degree of accuracy for digital sampling and equalization with low complexity.

While the above description is of the preferred embodiment of the present invention, it should be appreciated that the invention may be modified, altered, or varied without deviating from the scope and fair meaning of the following claims.

What is claimed is:

1. A symbol synchronizer for a software-defined communications system diversity receiver, comprising:
   a single matched filter for filtering an input digital signal with a match filtering function based on predetermined signal transfer function characteristics;
   a signal delay bank including a plurality of delay blocks each for delaying the input digital signal filtered by the single matched filter for a predetermined number of samples;

a complex correlator for correlating the input digital signal filtered by the single matched filter and delayed by the signal delay bank with a correlator reference signal, and for selecting an index of a path having a peak correlator value.

2. The symbol synchronizer of claim 1, wherein the single matched filter comprises a single complex sliding window matched filter for providing a sliding estimate of a predetermined number of most recent samples of the input digital signal.

3. The symbol synchronizer of claim 2, wherein the complex sliding window matched filter has an input/output relationship expressed mathematically as:

$$CSWMF(n)=\xi CSWMF(n-1)+(1/N)(\alpha x(n)-\gamma x(n-N)),$$

where CSWMF(n) is an output of the complex sliding window matched filter at time n, $\xi$ is a complex valued filter tap weight vector, $\alpha$ and $\gamma$ are respective complex valued tap weights, x(n) is an input to the complex sliding window matched filter at time (n), and N is a filter length of the complex sliding window matched filter.

4. The symbol synchronizer of claim 2, wherein the complex sliding window matched filter is for directly estimating symbol synchronization.

5. The symbol synchronizer of claim 4, wherein the complex correlator is for correlating the input digital signal filtered by the single complex sliding window matched filter and delayed by the signal delay bank with a correlator reference signal having a known reference pattern.

6. The symbol synchronizer of claim 5, wherein the complex correlator is for selecting the index of a path having a peak correlator value through a correlator maximum value block.

7. The symbol synchronizer of claim 6, wherein the correlator maximum value block is for averaging the input digital signal filtered by the single complex sliding window matched filter and delayed by the signal delay bank over a predetermined number of symbols.

8. The symbol synchronizer of claim 7, wherein the predetermined number of symbols is 16.

9. The symbol synchronizer of claim 1, wherein the complex correlator is for correlating the input digital signal filtered by the single matched filter and delayed by the signal delay bank with a correlator reference signal that is a correlation estimator.

10. The symbol synchronizer of claim 1, wherein the complex correlator is executed only at zero lag for correlating the input digital signal with a correlator reference signal that is a complex average power measurement of an output of the single matched filter.

11. The symbol synchronizer of claim 1, wherein the single matched filter is first downpsampled by a factor N equal to a number of samples per symbol, and wherein subsequent samples are then operated on by determining a complex average power.

* * * * *

UNITED STATES PATENT AND TRADEMARK OFFICE
CERTIFICATE OF CORRECTION

PATENT NO. : 6,836,507 B1
DATED : December 28, 2004
INVENTOR(S) : Gifford et al.

It is certified that error appears in the above-identified patent and that said Letters Patent is hereby corrected as shown below:

Column 9,
Line 3, delete "$J_{pq} = E\{| |y_k|^{p-\delta_p}|\}$" and insert -- $J_{pq} = E\{| |y_k|^p - \delta_p|\}$ --

Signed and Sealed this

Nineteenth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,836,507 B1
DATED : December 28, 2004
INVENTOR(S) : Gifford et al.

It is certified that error appears in the above-identified patent and that said Letters Patent is hereby corrected as shown below:

<u>Column 8</u>,
Line 45, delete "$\underline{t}^{(k+1)} = \underline{t}^k - cm_i\gamma_i Re[\varepsilon_{pq(k)}*diag\{w_1^*, w_2^*\}\underline{x\&}^*_k*$" and insert
--$\underline{t}^{(k+1)} = \underline{t}^k - cm_i\gamma_i Re[\varepsilon_{pq(k)}*diag\{w_1^*, w_2^*\}\underline{\ddot{x}}^*_k$--

Line 65, delete "$\underline{x\&}^*_k \equiv [\partial x_{k1}/t_1 \quad \partial x_{k2}/t_2]^T;$" and insert
--$\underline{\dot{x}}_k \equiv [\partial x_{k1}/t_1 \quad \partial x_{k2}/t_2]^T;$--

Signed and Sealed this

Thirty-first Day of May, 2005

JON W. DUDAS
*Director of the United States Patent and Trademark Office*